US007171206B2

(12) United States Patent
Wu (10) Patent No.: US 7,171,206 B2
(45) Date of Patent: Jan. 30, 2007

(54) METHOD AND SYSTEM FOR TRANSFERRING A COMMUNICATION SESSION

(75) Inventor: Chiung-Hsien Wu, Taipei (TW)

(73) Assignee: Koninklijke Philips Electronics, N.V., Eindhoven (NL)

( * ) Notice: Subject to any disclaimer, the term of this patent is extended or adjusted under 35 U.S.C. 154(b) by 963 days.

(21) Appl. No.: 09/929,118

(22) Filed: Aug. 14, 2001

(65) Prior Publication Data

US 2002/0082015 A1 Jun. 27, 2002

(30) Foreign Application Priority Data

Oct. 20, 2000 (EP) ................................. 00203656

(51) Int. Cl.
*H04Q 7/20* (2006.01)
(52) U.S. Cl. .................... 455/438; 455/437; 455/436; 370/331; 370/335; 709/219; 709/202
(58) Field of Classification Search ................ 455/438, 455/437, 436; 370/331, 335; 709/219, 202
See application file for complete search history.

(56) References Cited

U.S. PATENT DOCUMENTS

| 5,771,452 A | 6/1998 | Hanley et al. ............... 455/445 |
| 5,862,481 A | 1/1999 | Kulkarni et al. ............. 495/432 |
| 5,918,013 A | 6/1999 | Mighdoll et al. ............ 395/200 |
| 5,987,327 A * | 11/1999 | Lev et al. .................... 455/445 |
| 5,991,287 A | 11/1999 | Diepstraten et al. ........ 370/338 |
| 5,991,642 A * | 11/1999 | Watanabe et al. ........... 455/560 |
| 6,049,821 A | 4/2000 | Theriault et al. ........... 709/203 |
| 6,108,560 A * | 8/2000 | Navaro et al. .............. 455/517 |
| 6,571,107 B1 * | 5/2003 | Yahagi .................... 455/552.1 |
| 6,584,567 B1 * | 6/2003 | Bellwood et al. ........... 713/171 |
| 6,754,833 B1 * | 6/2004 | Black et al. ................... 726/7 |
| 6,795,444 B1 * | 9/2004 | Vo et al. ..................... 370/401 |
| 6,810,256 B2 * | 10/2004 | Stuempert et al. .......... 455/439 |
| 6,810,409 B1 * | 10/2004 | Fry et al. ..................... 709/202 |
| 6,963,927 B1 * | 11/2005 | Lee et al. .................... 709/241 |

OTHER PUBLICATIONS

Fujino et al., "Mobile Information Service Based On Multi-Agent Architecture," IEICE Transactions on Communications, Institute Of Electronics Information And Comm. Eng. Tokyo, JP, vol. E80-B, No. 10, Jan. 10, 1997, pp. 1401-1406.

* cited by examiner

*Primary Examiner*—Danh Cong Le (57) ABSTRACT

The invention relates to a method of and a system for transferring a communication session from one service area (101) to another (102), where each service area is associated with a transcoding proxy (111, 112) for transcoding communication sessions established in said service area to and from a format suitable for a mobile device (104). A gateway server (103) relays the communication session from a content server (105, 106, 107) via the appropriate transcoding proxy to the mobile device (104). When the mobile device (104) moves to the second service area (102), the second transcoding proxy (112) is contacted and session handling is transferred thereto. The transfer operation is transparent to the content server, so the session between mobile device (104) and content server (105, 106, 107) stays intact. The invention also relates to a mobile assistant server, a transcoding proxy and a mobile device for use in said system.

13 Claims, 4 Drawing Sheets

METHOD AND SYSTEM FOR TRANSFERRING A COMMUNICATION SESSION

The invention relates to a method of transferring a communication session established between a content server and a mobile device in a first service area of a communication network comprising a plurality of service areas, each service area being associated with a transcoding proxy for transcoding communication sessions established in said service area to and from a format suitable for the mobile device, the first service area being associated with a first transcoding proxy.

The invention further relates to a communication system arranged for transferring a communication session established between a content server and a mobile device in a first service area of a communication network comprising a plurality of service areas, each service area being associated with a transcoding proxy for transcoding communication sessions established in said service area to and from a format suitable for the mobile device, the first service area being associated with a first transcoding proxy.

The invention further relates to a mobile assistant server, a transcoding proxy and a mobile device for use in such a communication system.

A method according to the preamble is known from U.S. Pat. No. 5,771,452. Mobile devices allow users to access information from a variety of sources at any time and at any place. Such devices, for example mobile phones using the Wireless Application Protocol, or palmtop computers, typically only have limited processing power and rendering capabilities. Due to portability considerations, the mobile device is typically made as thin as possible, i.e. low power consumption, compact, lightweight, and so on. Thus it is not possible to include many features in this thin device, e.g. high-resolution image, or requiring a specific plug-in program. To facilitate access to the rich content offered by various information services, a content transcoding process needs to be executed automatically on an intermediate proxy when the intended content contains something beyond the capability of the mobile device. The transcoding proxy server converts various types of contents into formats that are acceptable for a specific mobile device. This transcoding process typically involves actions such as adjusting the presentation so it will fit on the small screen on the mobile device, removing unnecessary elements such as audio for devices that have no sound capabilities, scaling graphics to an appropriate size, compressing data for transmission to the mobile device, converting from e.g. HTML to WML, and so on.

A benefit of using this architecture is the simplification of client devices and the ability of browsing universal content on the World-Wide Web. Most of the complicated tasks have been put on the transcoding proxy server or even further pushed to the content server. Meanwhile, another advantage of using this technology is the automatic content adaptation to various client devices and access network bandwidth.

However, tomorrow's service infrastructure tends to be a heterogeneous one, especially for wireless. As an example scenario, assume that home connectivity is provided to a user using Bluetooth or Wireless LAN, and public access UMTS or GSM networks will be used when the user has moved outdoors. Since the networks are wireless, it would be very convenient to provide users a seamless handover between home and away, such that this mechanism is executed transparently to the users and preserves the continuation of services. While it is known to provide a seamless handover from one cellular network to another, there is a lack of managing mobility for the handover occurring in between two transcoding proxies, when a mobile device actively connected to a content server is moving from outdoors to home. The handover process consists of two steps. Firstly, the wireless access should be switched from GSM or UMTS used at the outdoors to Bluetooth or wireless LAN at home. Secondly, the serving transcoding proxy should be switched from the proxy in the outside to e.g. a home server inside. To solve this problem, the above-mentioned US patent discloses an architecture that uses transcoding proxies closely coupled with the central mobile switching networks. A connection is established between a content server and a transcoding proxy, which in turn establishes a connection with a mobile device. When the mobile device moves to another service area, the central mobile switching network facilitates a handover. The transcoding proxy then continues the communication session in the other service area. This way, the communication session between the content server and the transcoding proxy is kept intact when a handover occurs.

However, a disadvantage is that the transcoding proxy will become a bottleneck of the system since all traffic loads are on only one proxy. Besides, in heterogeneous environment, it is almost impossible to make a transcoding proxy available to two difference switching networks, i.e. the home network and the public cellular network.

It is an object of the invention to provide a method according to the preamble, which facilitates a seamless handover between heterogeneous mobile communication networks, while maintaining a communication session facilitated via a transcoding proxy.

This object is achieved according to the invention in a method comprising transferring the relaying of the communication session from the first transcoding proxy to a second transcoding proxy associated with a second service area from said plurality. Preferably, the mobile device initiates the transfer and selects the transcoding proxy to which the communication session is best transferred. The relaying of the communication session is then transferred from the first transcoding proxy to the second transcoding proxy, which completes the transfer, and is transparent to the user of the mobile device. The method according to the invention realizes a mobility management framework in a service network with multiple service areas and multiple transcoding proxies. Lower layer network information, such as the strength of an RF signal between mobile device and base station, and higher layer service area information are combined, which results in a better synchronization between the transport networks and the content network. Thus, a user is allowed to roam between service areas in a seamless and transparent way, even when the communication network is heterogeneous and the service areas use different protocols.

In an embodiment the method further comprises transferring session information related to the communication session from the first transcoding proxy to the second transcoding proxy. By transferring session information during the transcoding proxy handover process, it is achieved that the server and the mobile device can continue their session without having to restore the state of the communication session or having to start the communication session all over again.

In a further embodiment the method further comprises receiving from the mobile device a ready to transfer message identifying the second transcoding proxy. Since the mobile device is in a good position to determine when to perform a handover, e.g. when it is at the edge of the first service area, and to which service area the handover should be performed, it is advantageous to let the mobile device send a message identifying the associated transcoding proxy to transfer the relaying to.

In a variant of this embodiment the method further comprises suspending the communication session after the ready to transfer message has been received, and resuming the communication session after a resume message has been received from the mobile device. This embodiment has the advantage that no data will be lost during the transferring, because no data is transmitted at this time.

In a further embodiment the method further comprises receiving from the mobile device in the first service area a transfer request message, determining a neighbor group comprising transcoding proxies associated with one or more service areas from said plurality, the one or more service areas being adjacent to the first service area, and forwarding the transfer request message to the transcoding proxies from the neighbor group, in response to which at least one of said transcoding proxies sends a transfer reply message to the mobile device. As said, the mobile device is in a good position to determine when to perform a handover, and so it is advantageous to let the mobile device signal when to perform the handover by means of the transfer request message. Subsequently, transcoding proxies in service areas in the neighborhood of the first service area are notified by passing on the transfer request message. They respond by preferably broadcasting a transfer reply message to the mobile device. The mobile device receives at least some of these transfer reply messages (some may be lost because the sending transcoding proxies are out of the reception range of the mobile device) and can then elect one transcoding proxy. It can then send the ready to transfer message identifying the second transcoding proxy.

It is a further object of the invention to provide a communication system according to the preamble, which facilitates a seamless handover between heterogeneous mobile communication networks, while maintaining a communication session facilitated via a transcoding proxy.

This object is achieved according to the invention in a communication system comprising instructing means for transferring the relaying of the communication session from the first transcoding proxy to a second transcoding proxy associated with a second service area from said plurality.

It is a further object of the invention to provide a mobile device for use in the communication system according to the invention, which facilitates a seamless handover between heterogeneous mobile communication networks, while maintaining a communication session facilitated via a transcoding proxy.

This object is achieved according to the invention in a mobile device comprising communicating means for communicating a ready to transfer message, identifying a second transcoding proxy, to said migration means. Since the mobile device is in a good position to determine when to perform a handover, e.g. when it is at the edge of the first service area, and to which service area the handover should be performed, it is advantageous to let the mobile device send a message identifying the associated transcoding proxy to transfer the relaying to.

In an embodiment the mobile device further comprises transcoding proxy selection means for receiving one or more transfer reply messages from said at least one of said transcoding proxies, choosing said second transcoding proxy from said at least one of said transcoding proxies based on said one or more transfer reply messages, and communicating said ready to transfer message, identifying the second transcoding proxy, to said migration means.

In a further embodiment the mobile device further comprises strength measuring means for comparing strengths of the respective signals comprising the one or more echo reply messages. Since the strength of the signals is a good indication of the distance of the transcoding proxy from the mobile device, comparing strengths is an advantageous way of determining the best transcoding proxy to switch to.

In a further embodiment the mobile device further comprises storage means for storing a list of service areas and associated transcoding proxies. Alternatively or in addition to receiving transfer reply messages from nearby transcoding proxies, the mobile device can be provided with a look-up table comprising service areas and associated transcoding proxies. When the mobile device has determined which service area to transfer the communication session to, the associated transcoding proxy can be contacted.

These and other aspects of the invention will be apparent from and elucidated with reference to the embodiments shown in the drawings, in which.

Throughout the figures, same reference numerals indicate similar or corresponding features. Some of the features indicated in the drawings are typically implemented in software, and as such represent software entities, such as software modules or objects.

Figure 1:
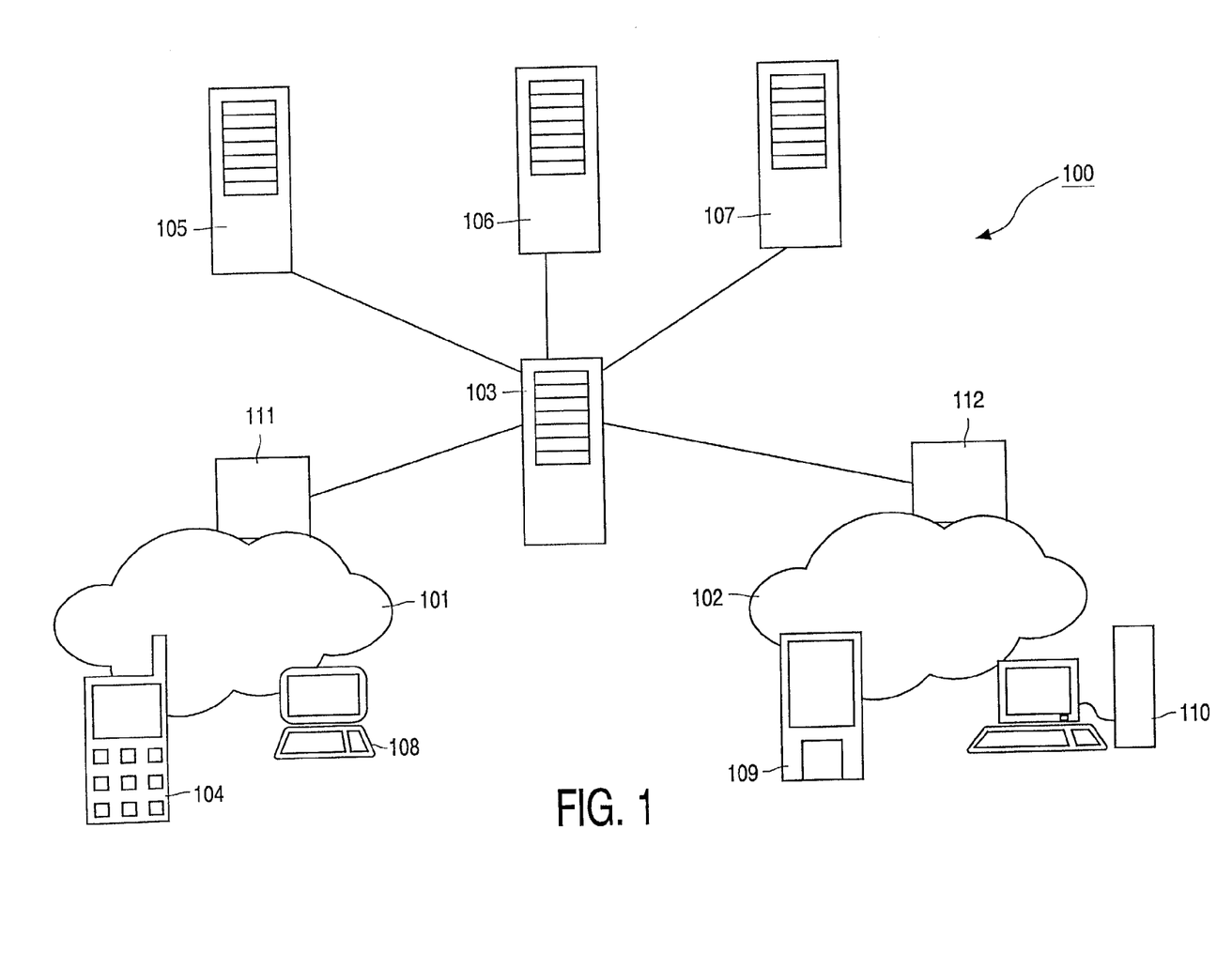
FIG. 1 schematically shows a communication network arranged for a communication session between a mobile device and a content server.

FIG. 1 schematically shows a communication network 100 arranged for a communication session between a mobile device 104 and a content server 105. The communication network 100 comprises a first service area 101 and a second service area 102. The service areas 101, 102 are associated with respective transcoding proxies 111, 112. The communication network 100 further comprises a gateway server 103. To illustrate the working of the invention, it is assumed that a communication session has been established between the mobile device 104 and the content server 105 in the first service area 101, using the GSM protocol The second service area 102 is suitable for communication sessions using the Bluetooth protocol. The communication network 100 also comprises further content servers 106, 107 and further mobile devices 108, 109, 110. The content servers 105, 106, 107 can be World-Wide Web servers or any other kind of servers. They may be accessible only to users of the communication network 100 and may require subscription.

The transcoding proxies 111, 112 transcode communication sessions established in their associated service areas 101, 102 to and from a format suitable for the mobile device 104, to facilitate access to the content offered by the content servers 106, 107. The transcoding proxies 111, 112 converts various types of contents into formats that are acceptable for the mobile device 104. This conversion typically involves actions such as adjusting the presentation so it will fit on the small screen on the mobile device 104, removing unnecessary elements such as audio for devices that have no sound capabilities, scaling graphics to an appropriate size, compressing data for transmission to the mobile device, converting from e.g. HTML to WML, and so on. Methods of transcoding communication sessions are known from e.g. U.S. Pat. Nos. 6,049,821 or 5,918,013. The gateway server 103 relays the communication session via transcoding proxy 111 associated with first service area 101, since the communication session has been established there.

Figure 2:
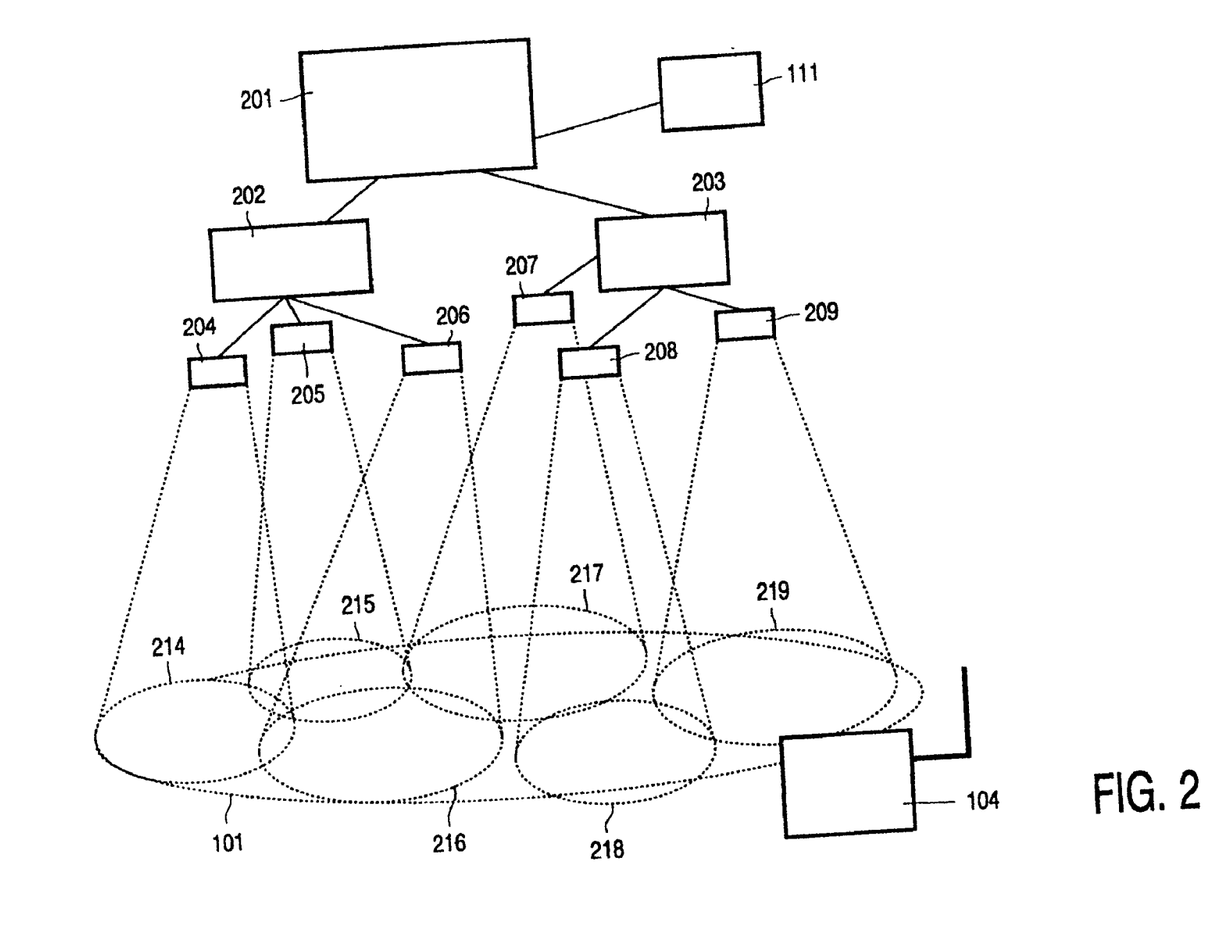
FIG. 2 schematically shows a service area in the communication network.

FIG. 2 schematically shows the first service area 101 in the communication network 100 in more detail. A switching node 201 is coupled to base station controllers 202, 203,. Base station controller (BSC) 202 controls base stations 204, 205, 206, and similarly BSC 203 controls base stations 207, 208, 209. The base stations 204–209 cover respective radio cells 214–219. Together, the radio cells 214–219 cover the first service area 101. The switching node 201, together with the BSCs 202, 203 and the base stations 204–209 facilitate mobile communication with the mobile device 104 in the first service area 101. When the mobile device 104 moves from one radio cell to another, the BSCs 202, 203 and the switching node 201 arrange for a seamless handover to the corresponding base station.

Of course, the above architecture can also be implemented with only one BSC which controls all the base stations 204–209, or with only the switching node 201 directly coupled to the base stations 204–209. The above architecture, however, makes it possible to facilitate mobile communication in a geographically wide area, in which one single switching node would be a bottleneck that hampers the efficiency of the entire system.

The switching node 201 is coupled to the gateway 103. This arrangement allows the content servers 105, 106, 107 to communicate with the mobile device 104 by establishing a communication session with the gateway 103. The gateway 103 will then relay the communication session to the switching node 201 so it can be relayed further to the mobile device 104 in one of the radio cells 214–219. When the mobile device 104 moves from one radio cell to another, only the switching node 201 needs to redirect the direction of the traffic to the appropriate BSC and/or base station. The content server and the gateway remain unaware of the mobile device's displacement within the first service area 101.

The transcoding proxy 111 is coupled to the switching node 201, so that the communication session can be transcoded to and from a format suitable for the mobile device 104. The transcoded session is then relayed by the switching node 201 to the appropriate BSC and/or base station, or to the gateway 103. For the purpose of the present invention, the switching node and the transcoding proxy coupled to it can be seen as one entity, and so will be referred to collectively as the transcoding proxy 111 unless a distinction needs to be made.

Figure 3:
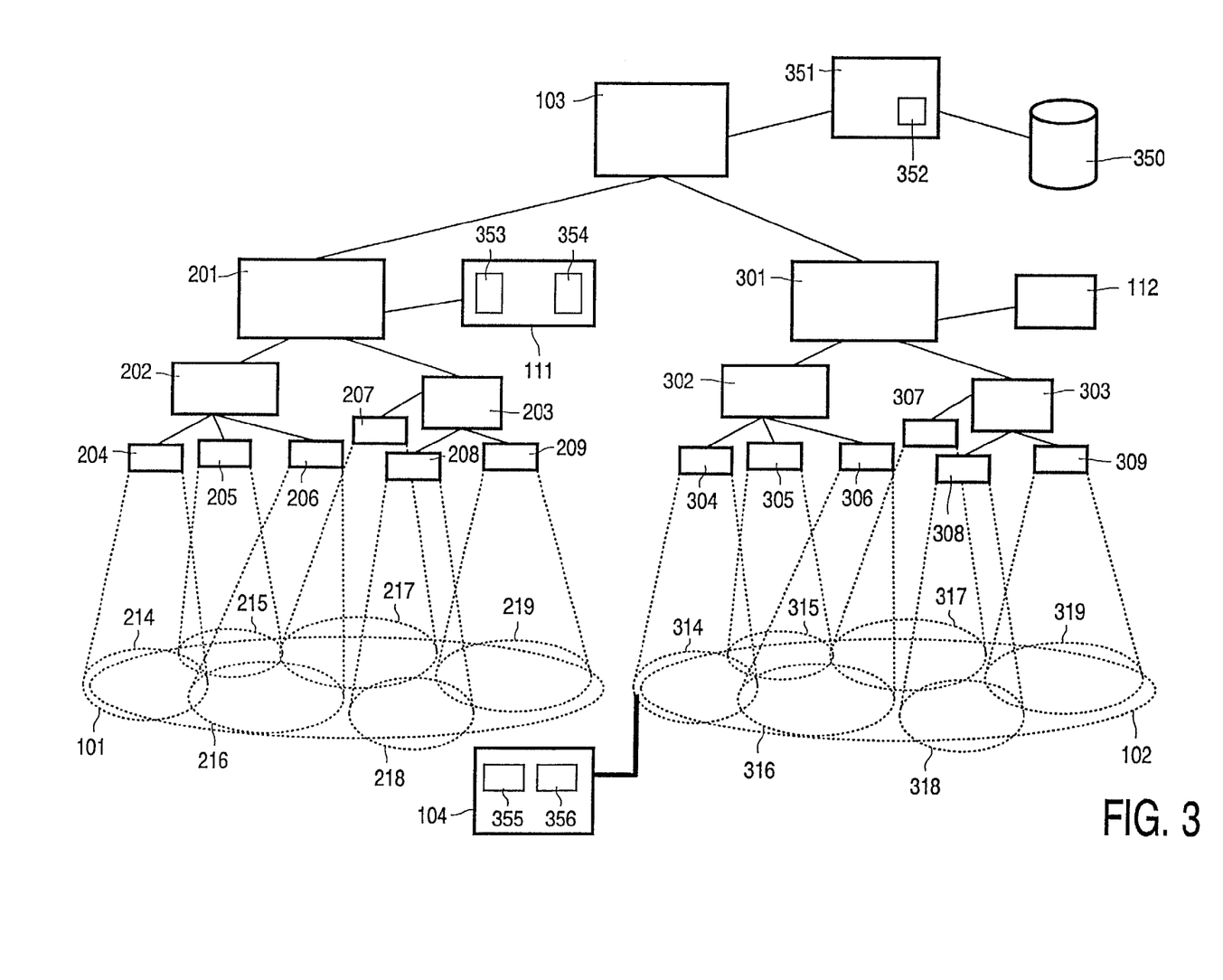
FIG. 3 schematically shows two adjacent service areas in the communication network.

FIG. 3 schematically shows the service areas 101, 102 adjacent in the communication network 100. In the second service area 102 there are a switching node 301, coupled to transcoding proxy 112 and to BSCs 302, 303, and base stations 304–309, covering respective service areas 314–319. The switching node 301, together with the BSCs 302, 303 and the base stations 304–309 facilitate mobile communication with the mobile device 104 when it is in the second service area 102, in a manner similar to the one described with reference to FIG. 2. However, the communication protocols used in the first and second service areas 101, 102 may be different. In a preferred embodiment, the protocol used in the first service area 101 is GSM, and the protocol used in the second service area 102 is Bluetooth, although of course any protocol for mobile communication, such as CDMA, UMTS or DECT, can be used.

The switching nodes 201, 301 are coupled to the gateway 103. This arrangement allows the content servers 105, 106, 107 to communicate with the mobile device 104, regardless of which service area it is in. The gateway 103 knows in which service area the communication session has been established, and thus is able to relay the session to the appropriate switching node.

The communication system comprising the aforementioned gateway 103, switching nodes 201, 301 base stations 204–209, 304–309 and transcoding proxies 111, 112 is arranged to transfer the communication session from the first service area 101 to the second service area 102 in such a fashion that the session remains active and unchanged. The session is typically an end-to-end communication session that may involve the exchange of Internet data packets. They can be divided into two types as follows:

1. Client-initiated access, which may trigger the execution of some application programs on the transcoding proxy, such as image transcoding, audio/video re-encoding, JAVA or WML script execution, and so on.
2. Network-initiated services, such as e-mail notification, Internet telephony, instant messaging, and so on.

The gateway server 103 knows that the mobile device 104 is within some service area covered by a certain transcoding proxy. A very quick solution can be easily derived for the existing GSM network. That is, the gateway server 103 should check the Visitor Location Register (VLR) for the mobile device's current location before sending its content to a transcoding proxy for a network-initiated session.

In general, in a heterogeneous wireless environment, the gateway server 103 may acquire this information from some mobility database which keeps track of the mobile device's current location. However, the gateway server 103 has no idea when the client will move to the territory of another transcoding proxy. Therefore if a handover occurs at the time when a session is running, the gateway server 103 should be informed in a very short time.

To facilitate the transfer of the communication session in accordance with the invention, a Roaming Realm Database 350 (RRDB) is preferably used. The RRDB 350 is stored in a Mobile Assistant Server 351 (MAS) which is described in detail below. The RRDB 350 and the MAS 351 are shown as separate entities in FIG. 3, but of course can also be implemented as a component of the gateway 103.

The RRDB 350 describes the service area profiles for each individual mobile user. Three RRDB profiles are defined here: the authentication profile, the service area profile, and the application profile. The authentication pro file is examined when the user first logons to the communication network 100 from any service area. The preferred initialization of the mobile device 104 is as follows:

Step 1. The mobile device 104 is powered on and a RF-level scan is performed.

Step 2. The mobile device 104 is attached to a communication network 100 with the only ability of talking to the MAS 351.

Step 3. The mobile device 104 sends a registration request to the MAS 351.

Step 4. The MAS 351 replies to the mobile device 104 with an authentication request (password).

Step 5. The mobile device 104 replies to the MAS 351 with a password.

Step 6. The MAS 351 checks the authentication profile in its RRDB 350. And if it matches, it will send a positive feedback message containing the following information:
  The transcoding proxy to use.
  The list of neighboring transcoding proxies and related information.

Step 7. Connection setup request from the mobile device 104 (client-initiated) or from the registered content servers (network-initiated).

The RF-level scan from Step 1 can be done in a wide-band fashion. For example, in the coexistence of GSM and Bluetooth, the RF strength should be measured in both 900/1800 MHz and 2.4 GHz.

The service area profile gives users the information of neighboring transcoding proxies adjacent to the current serving transcoding proxy for the assistance of a handover operation. It is preferably stored in the MAS 351 using a format of a table with including the location of the corresponding transcoding proxy, the underlying mobile access network and the related RF frequency. If a mobile device logons from a service area defined in the profile, then it is allowed to use the corresponding transcoding service in this area.

Figure 4:
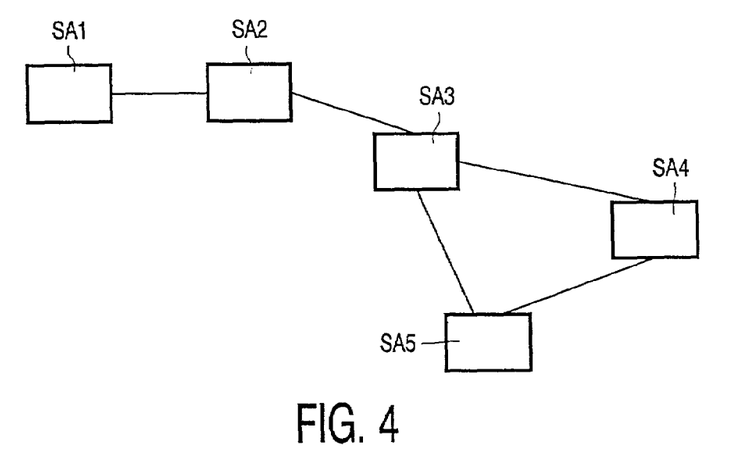
FIG. 4 schematically shows a graph of the connectivity between transcoding proxies.

FIG. 4 schematically shows a graph of the connectivity between transcoding proxies. Shown are the service areas SA1 through SA5 from table 1. To assist the handover process, the mobile device 104 is also loaded with the information of neighboring transcoding proxies adjacent to the current service area, as described the procedure for mobile device initialization. The current service area means the service area to which the mobile device 104 is logging on. For a quick derivation of the neighboring list, a transcoding proxy adjacent network (TPAN) is maintained at the MAS for each user's profile. This graph is shown in FIG. 4.

When the mobile device 104 enters a new service area, the MAS can derive a neighbor list of service areas that are adjacent to this new serving service area. Then, the list is downloaded to the mobile device 104 for the assistance of the handover process. The neighbor list technology and terminology has been used in GSM. However, in GSM this is used for the handover between two Base Transceiver Stations. In the present invention, the neighbor list is used for the handover between two transcoding proxies in adjacent service areas. Thus the present invention can be seen as an enhancement to the GSM system because it links to the application layer and is also applicable to the handover in heterogeneous mobile access networks, e.g. GSM to UMTS or Bluetooth.

Each entry on the neighbor list is exactly one of the entries in the service area profile. Thus this list is a subset of the service area profile. Table 2 shows an example of this neighbor list when the current service area is SA3 as defined by Table 1.

TABLE 1

Service Area Profile

| Service Area ID | TP ID | Type of TP address | TP address | Type of MAN | MAN mode (if any) | MAN RF frequency | ... |
|---|---|---|---|---|---|---|---|
| SA1 | TP100 | IP address | 140.135.22.2 | GSM | | 900 MHz | |
| SA2 | TP105 | IP address | 140.114.23.23 | GPRS | | 1800 MHz | |
| SA3 | TP112 | WWW URL | www.video.web.com/home.html | UMTS | FDD | 2000 MHz | |
| SA4 | TP117 | IP address | 192.122.23.12 | UMTS | FDD | 2000 MHz | |
| SA5 | TP122 | WWW URL | www.philips.com/res.html | Bluetooth | 20 dBm | 2.4 GHz | |
| ... | | | | | | | |

TABLE 2

A neighbor list example (current service area = SA3 of Table 1)

| Service Area ID | TP ID | Type of TP address | TP address | Type of MAN | MAN mode (if any) | MAN RF frequency | ... |
|---|---|---|---|---|---|---|---|
| SA2 | TP105 | IP address | 140.114.23.23 | GPRS | | 1800 MHz | |
| SA4 | TP117 | IP address | 192.122.23.12 | UMTS | FDD | 2000 MHz | |
| SA5 | TP122 | WWW URL | Www.philips.com/res.html | Bluetooth | 20 dBm | 2.4 GHz | |

The application profile defined in the RRDB 350 records the registered services or applications that the mobile device 104 has subscribed to. This is essential for some network-initiated services such as e-mail/news notification, location-tracking service, etc.

The handover procedure comprises determining which service area the mobile device 104 should move into, and arranging for the communication session to be relayed via the transcoding proxy associated with that service area. In the example below, the mobile device 104 will move from the first service area 101 to the second service area 102, respectively associated with transcoding proxy 111 and transcoding proxy 112.

The handover procedure is initiated when the mobile device 104 finds that the boundary of the service area has been reached. The conceptual boundary is detected when the RF signal strength in the serving service area is getting low. However, preferably a distinction is made whether the boundary is crossing two service areas or just crossing the internal cells of the same service area. This will be discussed in more detail below. When the boundary has been reached, the mobile device 104 sends a transfer request message.

The transfer request message is preferably sent to the MAS 351 or, alternatively, to the first transcoding proxy 111. The MAS 351 has a migration initialization module 352 which forwards the transfer request message to the transcoding proxies on the neighbor list for the first service area 101. In the embodiment of the communication network as discussed above, the neighbor list for the first service area 101 comprises only the second transcoding proxy 112.

Upon receiving the transfer request message, these transcoding proxies send a transfer reply message which contains information about their capabilities to the mobile device 104, preferably by broadcasting said transfer reply message.

In GSM, the mobile device 104 constantly monitors the signals of its neighboring cells using a broadcast control channel (BCCH) sent by the base station of each neighboring cell to determine when a radio cell handover should be performed. The transfer reply message can be broadcasted in the BCCH. If the mobile device 104 receives a transfer reply message in one of the neighboring BCCHs, it must inform the switching node or gateway 103 to choose that base station to perform a GSM handover to. This ensures that the network-level handover from one GSM cell to another and the service area handover do not conflict with each other. For other mobile communication protocols, a similar mechanism can be used.

If the mobile device 104 receives more than one transfer reply message, it must choose one of them, using its transcoding proxy selection module 355. Preferably, in a GSM environment, the mobile device 104 has a strength measuring module 356 which assists the transcoding proxy selection module 355 by determining the transcoding proxy associated with the service area for which the strongest signal in the BCCH was detected. The mobile device 104 then sends a ready to transfer message, identifying the second transcoding proxy 112, to the first transcoding proxy 111.

The first transcoding proxy 111 has a migration module 353 which receives the ready to transfer message and, in response to receiving the ready to transfer message, transfers session information related to the communication session to the second transcoding proxy 112. The first transcoding proxy 111 further has instructing module 354 which instruct the gateway server 103 to stop relaying the communication session via the first transcoding proxy 111 and to start relaying the communication session via the second transcoding proxy 112.

Preferably the communication session is suspended after the ready to transfer message has been sent, and resumed after a resume message is received from the mobile device 104.

Figure 5:
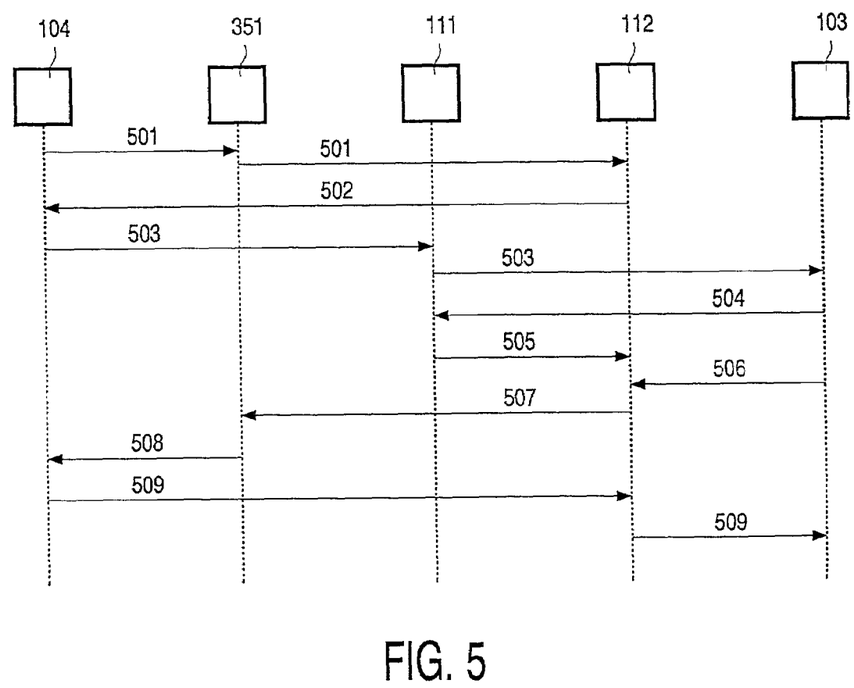
FIG. 5 shows a possible message flow in a handover procedure.

FIG. 5 shows the message flow in the handover procedure as described above. In summary, the message flow involves the following steps:

Step 1. The mobile device 104 detects a boundary of the first service area 101. A transfer request message 501 is sent to the MAS 351.

Step 2. The MAS 351 forwards the transfer request message 501 to the transcoding proxies residing in the adjacent service areas to SAO.

Step 3. The mobile device 104 receives a transfer reply message 502 from the second transcoding proxy 112 located in the second service area 102.

Step 4. The mobile device 104 sends a ready to handover message 503 to the first transcoding proxy 111. The ready to handover message 503 is forwarded to the gateway server 103 to transfer the session to the second transcoding proxy 112 and to hold the current active session temporarily.

Step 5. The gateway server 103 sends a message 504 to the first transcoding proxy 111 to inform it that the session has been held.

Step 6. The transcoding proxy 111 copies 505 the session status variables, parameters, and all related data to the second transcoding proxy 112. The gateway server 103 then establishes 506 a new session with the second transcoding proxy 112 based on the data from the first transcoding proxy 111.

Step 7. The second transcoding proxy 112 informs 507 the MAS 351 that the session migration from the first transcoding proxy 111 to the second transcoding proxy 112 is successful.

Step 8. The MAS 351 issues a handover command 508 to the mobile device 104 to change to the second service area 102.

Step 9. When the second transcoding proxy 112 receives a resume message 509 from the mobile device 104, it forwards this to the gateway server 103 so the session can be resumed.

It will be readily understood that small variations in the procedure and the message flow given above are possible without deviating from the scope of the invention. For instance, the MAS 351 may assist in choosing the second transcoding proxy 112, or in notifying the gateway server 103. The second transcoding proxy 112 or the MAS 351, rather than the first transcoding proxy 111, may alternatively instruct the gateway server 103 to stop relaying the communication session via the first transcoding proxy 111 and to start relaying the communication session via the second transcoding proxy 112.

The most critical performance metric in a mobile environment is the delay due to handover. In the present invention, the delay is caused by the holding of the session. The handover delay $d_{ho}$ can be computed as follows:

$$d_{ho} = d_{ses\_mi} + d_{ho\_co}$$

where $d_{ses\_mi}$ is the session migration time from the old transcoding proxy to the new transcoding proxy, and $d_{ho\_co}$ is the delay caused by transmitting the handover command from the MAS 351 to the mobile device 104.

$d_{ses\_mi}$ may vary among different applications. A common part is a pair of initialization messages exchanged for creating a new user space at the second transcoding proxy 112 and the notification of initial parameters for the specific mobile device. Then, the current execution status variables should be sent from the first transcoding proxy 111 to the second transcoding proxy 112.

To support network initiated services, the gateway server 103 should know the most up-to-date location information of the mobile device 104 so that the service messages can be sent to the appropriate transcoding proxy. There are two preferred strategies in implementing this:
1. Redirection via MAS: All services go to the MAS 351 first and will be redirected to the appropriate transcoding proxy.
2. Proxy address inquiry to MAS: A query is sent to MAS for obtaining the address of the right transcoding proxy to choose.

In a GSM network, the network-initiated messages are routed through the help of the Visitor Location Register (VLR) and the Home Location Register (HLR). If the invention is implemented on GSM, then the MAS 351 can be built as an extension of the HLR/VLR or it can be a standalone server with connections to the GSM mobile switching center and the HLR/VLR.

The transfer request message from the mobile device 104 to the MAS 351 can be implemented by a high-layer control message, e.g. an UDP packet. However, the implementation of the transfer reply message is more critical. The transfer reply message is preferably realized as a broadcast message within the whole service area. And since it is designed for the mobile device 104 in the neighbor scanning mode, it must be visible before a mobile device 104 has attached to the network. In GSM, this is achievable by adding a new information element in the Broadcast Control Channel (BCCH) which is constantly sent out by the base station controller. In a normal GSM network handover, BCCH is also the reference channel when a handset is going to switch over to another radio cell.

The mobile device 104 will never know whether it is in a service area boundary when it detects a low RF signal strength. This is because there is more than one radio cell within a service area. If a low RF signal strength is detected, there are two possibilities. First, it could be in the inner cell of the service area. Thus only network level handover should be requested. Second, it could be in the borderline cell of a service area. Therefore a transcoding proxy handover should be requested.

In GSM, a handset knows the ID of its serving cell. Assuming that MAS 351 has a database storing the IDs of all borderline cells of each service area, the boundary detection can be easily implemented as follows.

When the mobile device 104 detects a low RF signal strength, it assumes that it is in a service area boundary. According to handover procedures as described above, a transfer request message will be sent to the MAS 351. This transfer request message is carrying the cell ID of the serving cell. If the MAS 351 verifies that this cell is in the service area boundary, it replies to the mobile device 104 with a positive feedback and forwards the request to all the transcoding proxies in the neighboring service areas. If it is not in a service area boundary, it simply replies to the mobile device 104 with a negative feedback.

In an alternative embodiment, one transcoding proxy can be associated with multiple service areas. This can be convenient if the expected traffic or expected transcoding workload is relatively low.

In an alternative embodiment, no gateway server 103 is necessary. This requires that the content server 104 is aware of the architecture of the communication network 100, and can perform the role of the gateway server 103 itself. Thus, in the above description, the gateway server 103 and the content server 104 can be one and the same entity. The steps in the handover procedure that involve a communication between the gateway server 103 and the content server 104 in FIG. 5 can then be omitted or replaced by local communications.

The invention claimed is:

1. A method of transferring a communication session established between a content server and a mobile device in a first service area of a communication network comprising a plurality of service areas, each service area being associated with a transcoding proxy for transcoding content provided during a communication session established in said service area to and from a format suitable for the mobile device, the method comprising:
   transferring the relaying of the communication session from the first transcoding proxy associated with a first service area of said plurality of service areas to a second transcoding proxy associated with a second service area of said plurality of service areas;
   receiving from the mobile device in the first service area a transfer request message;
   determining a group comprising transcoding proxies associated with one or more service areas from said plurality, the one or more service areas being near to the first service area; and
   forwarding the transfer request message to the transcoding proxies from the group, in response to which at least one of said transcoding proxies sends a transfer reply message to the mobile device.

2. The method of claim 1, further comprising transferring session information related to the communication session from the first transcoding proxy to the second transcoding proxy.

3. The method of claim 1, further comprising receiving from the mobile device a ready to transfer message identifying the second transcoding proxy.

4. The method of claim 3, further comprising suspending the communication session after the ready to transfer message has been received, and resuming the communication session after a resume message has been received from the mobile device.

5. A communication system arranged for transferring a communication session established between a content server and a mobile device in a first service area of a communication network comprising a plurality of service areas, each service area being associated with a transcoding proxy for transcoding content provided during a communication sessions established in said service area to and from a format suitable for the mobile device, the communication system further comprising:
   instructing means for transferring the relaying of the communication session from the first transcoding proxy associated with a first service area of the plurality of service areas to a second transcoding proxy associated with a second service area from said plurality of service areas; and
   migration initialization means for receiving from the mobile device in the first service area a transfer request message, determining a group having transcoding proxies associated with one or more service areas from said plurality, the one or more service areas being near to the first service area, and forwarding the transfer request message to the transcoding proxies from the group, in response to which at least one of said transcoding proxies sends a transfer reply message to the mobile device.

6. The communication system of claim 5 further comprising migration means for receiving from the mobile device a ready to transfer message identifying the second transcoding proxy.

7. A mobile assistant server for use in the communication system of claim 5 comprising said instructing means.

8. A transcoding proxy for use in the communication system of claim 5 comprising said instructing means.

9. The transcoding proxy as claimed in claim 6 further comprising migration means for receiving from the mobile device a ready to transfer message identifying the second transcoding proxy.

10. A mobile device for use in the communication system of claim 6 comprising communicating means for communicating a ready to transfer message, identifying a second transcoding proxy, to said migration means.

11. The mobile device of claim 10 further comprising transcoding proxy selection means for receiving one or more transfer reply messages from at least one transcoding proxy, choosing the second transcoding proxy from said at least one transcoding proxy based on said one or more transfer reply messages.

12. The mobile device of claim 11 further comprising strength measuring means for comparing strengths of the respective signals comprising the one or more echo reply messages.

13. The mobile device of claim 10 further comprising storage means for storing a list of service areas and associated transcoding proxies.

* * * * *